(12) United States Patent
Belmar et al.

(10) Patent No.: US 7,543,095 B2
(45) Date of Patent: Jun. 2, 2009

(54) MANAGING INPUT/OUTPUT INTERRUPTIONS IN NON-DEDICATED INTERRUPTION HARDWARE ENVIRONMENTS

(75) Inventors: Brenton F. Belmar, Port Ewen, NY (US); Janet R. Easton, Woodstock, NY (US); Tan Lu, Poughkeepsie, NY (US); Damian L. Osisek, Vestal, NY (US); Richard P. Tarcza, Kingston, NY (US); Leslie W. Wyman, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/125,963

(22) Filed: May 23, 2008

(65) Prior Publication Data

US 2008/0235425 A1     Sep. 25, 2008

Related U.S. Application Data

(63) Continuation of application No. 11/428,085, filed on Jun. 30, 2006, now Pat. No. 7,380,041, which is a continuation of application No. 10/435,907, filed on May 12, 2003, now Pat. No. 7,130,949.

(51) Int. Cl.
*G06F 13/24* (2006.01)
*G06F 11/10* (2006.01)

(52) U.S. Cl. .............................. 710/260; 710/5; 710/36; 710/261; 710/262; 714/10

(58) Field of Classification Search ........................ None
See application file for complete search history.

(56) References Cited

U.S. PATENT DOCUMENTS 4,564,903 A     1/1986   Guyette et al. .............. 364/300

(Continued)

FOREIGN PATENT DOCUMENTS

EP          0072107 A2     2/1983

(Continued)

OTHER PUBLICATIONS

"zSeries Features For Optimized Sockets-Based Messaging: Hiper Sockets and OSA-Express," M.E. Baskey, M. Eder, D.A. Elko, B.H. Ratcliff, D.W. Schmidt, IBM J. Res. & Dev., vol. 46, No. 4/5, Jul./Sep. 2002, pp. 475-485.

(Continued)

*Primary Examiner*—Paul R Myers
*Assistant Examiner*—Brian T Misiura
(74) *Attorney, Agent, or Firm*—Arthur Ortega, Esq.; Blanche E. Schiller, Esq.; Heslin Rothenberg Farley & Mesiti P.C.

(57) ABSTRACT

Input/output interruptions are managed in computing environments that do not use dedicated per-guest interruption hardware to present interruptions. Dispatchable guest programs in the environment receive I/O interruptions directly without hypervisor intervention. This is facilitated by using one or more interruption controls stored in memory and associated with each guest program. For those guest programs that are not currently dispatchable, interruptions can be posted for the guests and notifications to the hypervisor can be aggregated. The hypervisor can then process a plurality of notifications for the plurality of guests in a single invocation.

2 Claims, 5 Drawing Sheets

U.S. PATENT DOCUMENTS

| | | | |
|---|---|---|---|
| 4,627,054 A | 12/1986 | Cooper et al. | 371/11 |
| 4,812,967 A | 3/1989 | Hirosawa et al. | 364/200 |
| 4,835,685 A | 5/1989 | Kun | 710/260 |
| 5,222,215 A | 6/1993 | Chou et al. | 710/260 |
| 5,291,605 A | 3/1994 | Takagi et al. | 710/48 |
| 5,361,375 A | 11/1994 | Ogi | 395/800 |
| 5,386,524 A | 1/1995 | Lary et al. | 395/400 |
| 5,437,033 A | 7/1995 | Inoue et al. | 395/700 |
| 5,511,217 A | 4/1996 | Nakajima et al. | 395/800 |
| 5,553,291 A | 9/1996 | Tanaka et al. | 718/1 |
| 5,555,414 A | 9/1996 | Hough et al. | 395/734 |
| 5,600,805 A | 2/1997 | Fredericks et al. | 710/5 |
| 5,621,912 A | 4/1997 | Borruso et al. | 395/406 |
| 5,696,970 A | 12/1997 | Sandage et al. | 395/681 |
| 5,715,419 A | 2/1998 | Szczepanek et al. | 395/421.02 |
| 6,078,970 A | 6/2000 | Nordstrom et al. | 710/19 |
| 6,079,623 A | 6/2000 | Ahn et al. | 235/492 |
| 6,195,730 B1 | 2/2001 | West | 711/121 |
| 6,279,064 B1 | 8/2001 | Bronson et al. | 710/112 |
| 6,530,078 B1 | 3/2003 | Shmid et al. | 717/138 |
| 6,996,638 B2 | 2/2006 | Brice, Jr. et al. | 710/36 |
| 2003/0167353 A1 | 9/2003 | de Bonet et al. | 709/318 |
| 2004/0117532 A1 | 6/2004 | Bennett et al. | 710/260 |
| 2004/0123288 A1 | 6/2004 | Bennett et al. | 718/1 |
| 2006/0174247 A1 | 8/2006 | Farrell et al. | 718/104 |
| 2007/0150897 A1 | 6/2007 | Leeman, Jr. | 718/100 |

FOREIGN PATENT DOCUMENTS

| | | |
|---|---|---|
| EP | 0419723 A1 | 4/1991 |
| EP | 0549931 A1 | 7/1993 |

OTHER PUBLICATIONS

"A Virtual Machine Introspection Based Architecture for Intrusion Detection," T. Garfinkil, M. Rosenblum, Feb. 2003.

MANAGING INPUT/OUTPUT INTERRUPTIONS IN NON-DEDICATED INTERRUPTION HARDWARE ENVIRONMENTS

CROSS-REFERENCE TO RELATED APPLICATIONS/PATENTS

This application is a continuation of U.S. patent application Ser. No. 11/428,085, filed Jun. 30, 2006, now U.S. Pat. No. 7,380,041, issued May 27, 2008, entitled "MANAGING INPUT/OUTPUT INTERRUPTIONS IN NON-DEDICATED INTERRUPTION HARDWARE ENVIRONMENTS," which is a continuation of U.S. patent application Ser. No. 10/435,907 filed May 12, 2003, now U.S. Pat. No. 7,130,949, issued Oct. 31, 2006, entitled "MANAGING INPUT/OUTPUT INTERRUPTIONS IN NON-DEDICATED INTERRUPTION HARDWARE ENVIRONMENTS", Belmar et al., the entirety of which are hereby incorporated herein by reference.

FIELD OF THE INVENTION

This invention relates, in general, to managing input/output (I/O) interruptions, and in particular, to managing I/O interruptions in environments that present I/O interruptions to guests without using per-guest interruption hardware.

BACKGROUND OF THE INVENTION

As computing environments increase in the number of guests that they service, it is difficult to have interruption hardware dedicated to each guest. For example, in virtualized real memory environments, such as those based on the z/VM virtual machine support, offered by International Business Machines Corporation, Armonk, New York, a large number of low utilization guest operating systems are capable of being serviced. Typically, a virtual machine hypervisor controls the interactions between the guest operating systems and the physical resources. The physical resources are owned by the hypervisor, and the hypervisor dispatches the resources as needed to meet the guest operating systems' processing demands. The hypervisor is used in this manner, since the large number of guests (e.g., hundreds or thousands) that are possible precludes the hypervisor from simply partitioning and assigning the hardware resources to the configured guests, as with other types of virtualization, such as with logical partitioning.

In addition to dispatching responsibilities, the hypervisor has many other responsibilities, including managing I/O interruptions for the guest operating systems. When an I/O interruption targets a guest operating system, the hypervisor takes control because there are insufficient native hardware controls to allow each of the possible many virtual machines to be assigned its own unique set of interruption controls. Thus, in response to an I/O interruption, such as an adapter interruption, a condition is recognized which causes the hypervisor to gain control. The hypervisor then examines the VM-owned adapter state indicators to identify the signaling device, correlates that device to the owning guest, posts the guest-owned state indicator, and makes a virtual adapter interruption pending to the associated guest operating system. This interruption interception and subsequent interruption processing overhead is significant, and with the increasing number of guest operating systems that can be processed, the overhead associated with using the hypervisor for such adapter interruptions is becoming prohibitive.

Based on the foregoing, a need exists for an enhanced capability to handle I/O interruptions. For example, a need exists for a technique that minimizes hypervisor involvement in managing I/O interruptions.

SUMMARY OF THE INVENTION

The shortcomings of the prior art are overcome and additional advantages are provided through the provision of a system of managing I/O interruptions. The system includes, for instance, an aggregated list of a plurality of notifications for a plurality of guest programs of a computing environment for which a plurality of I/O interruptions are to be presented; and a hypervisor of the computing environment to process at least one notification of the plurality of notifications of the list.

In another aspect of the present invention, an article of manufacture including at least one computer usable storage medium having computer readable program code logic stored thereon to manage input/output (I/O) interruptions is provided. The article of manufacture includes, for instance, logic to obtain an I/O interruption for a guest program of a virtualized real memory environment; logic to determine a dispatch state of the guest program; logic to provide the I/O interruption to the guest program absent intervention by a hypervisor of the virtualized real memory environment, in response to the dispatch state being of one state; and logic to provide the I/O interruption to the guest program with hypervisor intervention, in response to the dispatch state being of another state.

Computer program products, systems and/or methods corresponding to the above-summarized claims are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, an I/O interruption capability is provided in which hypervisor involvement in managing I/O interruptions is minimized. For example, in non-dedicated interruption hardware environments, I/O interruptions, such as adapter interruptions, are presented directly to guest programs (e.g., guest operating systems) which are dispatched or due to be dispatched (i.e., dispatchable) without requiring any hypervisor involvement. As a further example, for guests not due to be dispatched (i.e., non-dispatchable), interruptions can be posted for the guests, and notifications to the hypervisor can be aggregated, such that a single invocation of the hypervisor can process a plurality of notifications for a plurality of guest programs.

Figure 1:
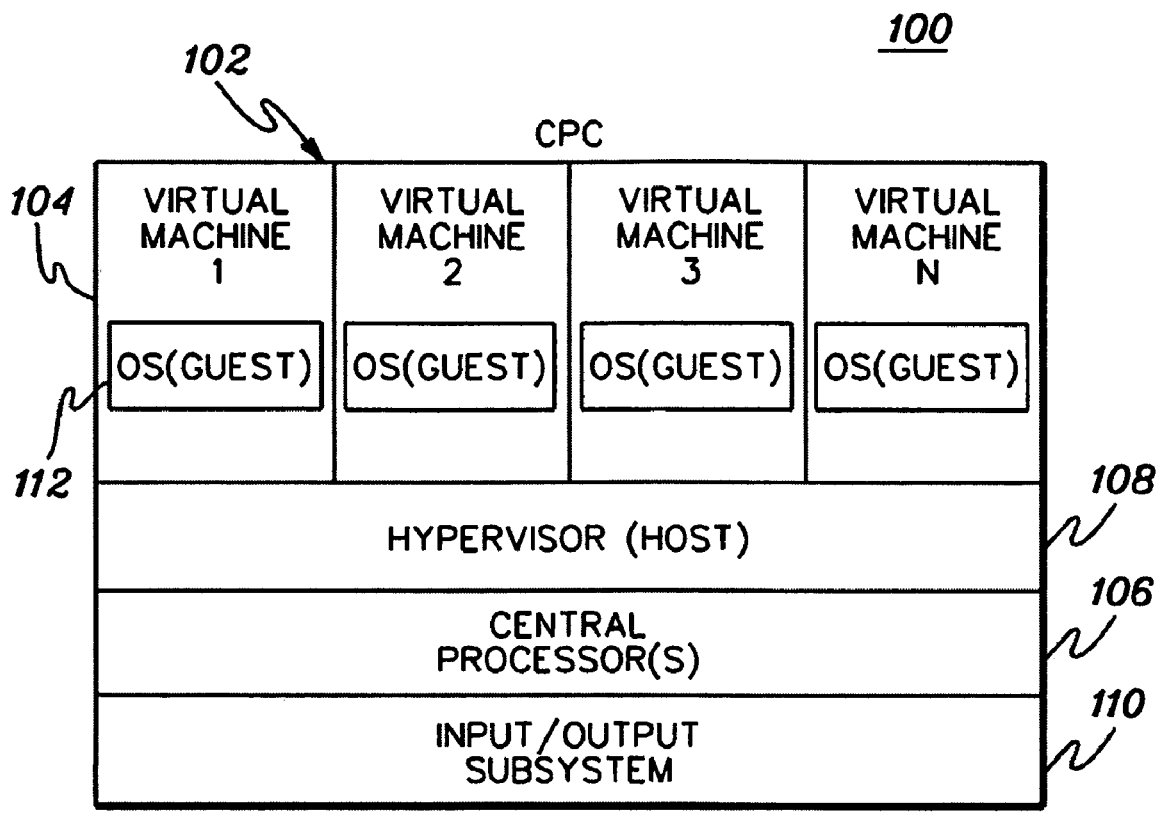
FIG. 1 depicts one embodiment of a computing environment to incorporate and use one or more aspects of the present invention.

One embodiment of a computing environment to incorporate and use one or more aspects of the present invention is described with reference to FIG. 1. Computing environment 100 is based, for instance, on the z/Architecture offered by International Business Machines Corporation, Armonk, N.Y. The z/Architecture is described in an IBM® publication entitled, "z/Architecture Principles of Operation," IBM® Publication No. SA-22-7832-00, December 2000, which is hereby incorporated herein by reference in its entirety. (IBM® is a registered trademark of International Business Machines Corporation, Armonk, N.Y., USA. Other names used herein may be registered trademarks, trademarks, or product names of International Business Machines Corporation or other companies.) In one example, a computing environment based on the z/Architecture includes an eServer zSeries, offered by International Business Machines Corporation, Armonk, N.Y.

As one example, computing environment 100 includes a central processor complex (CPC) 102 providing virtual machine support. CPC 102 includes, for instance, one or more virtual machines 104, one or more central processors 106, at least one hypervisor 108 (e.g., a control program), and an input/output subsystem 110, each of which is described below.

The virtual machine support of the CPC provides the ability to operate large numbers of virtual machines, each capable of hosting a guest operating system 112, such as Linux. Each virtual machine 104 is capable of functioning as a separate system. That is, each virtual machine can be independently reset, host a guest operating system, and operate with different programs. An operating system or application program running in a virtual machine appears to have access to a full and complete system, but in reality, only a portion of it is available.

In this particular example, the model of virtual machines is a V=V model, in which the memory of a virtual machine is backed by virtual memory, instead of real memory. Each virtual machine has a virtual linear memory space. The physical resources are owned by a hypervisor 108, such as a VM hypervisor, and the shared physical resources are dispatched by the hypervisor to the guest operating systems, as needed, to meet their processing demands. This V=V virtual machine model assumes that the interactions between the guest operating systems and the physical shared machine resources are controlled by the VM hypervisor, since the large number of guests typically precludes the hypervisor from simply partitioning and assigning the hardware resources to the configured guests. One or more aspects of a V=V model are further described in an IBM publication entitled "z/VM: Running Guest Operating Systems," IBM Publication No. SC24-5997-02, October 2001, which is hereby incorporated herein by reference in its entirety.

Central processors 106 are physical processor resources that are assignable to a virtual machine. For instance, virtual machine 104 includes one or more logical processors, each of which represents all or a share of a physical processor resource 106 that may by dynamically allocated to the virtual machine. Virtual machines 104 are managed by hypervisor 108. As examples, the hypervisor may be implemented in microcode running on processors 106 or be a part of a host operating system executing on the machine. In one example, hypervisor 108 is a VM hypervisor, such as z/VM®, offered by International Business Machines Corporation, Armonk, N.Y. One embodiment of z/VM® is described in an IBM publication entitled "z/VM: General Information Manual," IBM Publication No. GC24-5991-04, October 2001, which is hereby incorporated herein by reference in its entirety.

Input/output subsystem 110 directs the flow of information between input devices and main storage. It is coupled to the central processing complex, in that it can be part of the central processing complex or separate therefrom. The I/O subsystem relieves the central processors of the task of communicating directly with the I/O devices coupled to the CPC and permits data processing to proceed concurrently with I/O processing. The I/O subsystem includes I/O communications adapters, such as QDIO adapters, infiniband adapters, etc., used in communicating with the I/O devices.

At times, the I/O subsystem produces interruptions that are to be presented to the guest operating systems of the virtual machines. In one example, these interruptions include adapter interruptions. Adapter interruptions have no associated status information (i.e., no other information apart from the interrupt initiative), but allow a device to initiate a program response to a device operation. An adapter interruption (or other I/O interruption) may be presented directly to a guest without hypervisor intervention, in accordance with an aspect of the present invention. For example, an adapter interruption for a dispatchable guest operating system is provided to the guest operating system without hypervisor intervention. The CPC (e.g., firmware or microcode) is able to present the interruption without knowledge or care of the hypervisor. To facilitate this, the CPC employs one or more controls associated with the guest, as described in further detail below.

Associated with each guest is a small amount of memory to maintain interruption virtualization and control information dedicated to that guest. As one example, the controls are provided in a contiguous block of storage, referred to herein as a guest interruption state area (GISA). One GISA is established for and is dedicated to each guest, and may be updated by the CPC directly without hypervisor intervention, or by the hypervisor for certain situations.

Figure 2:
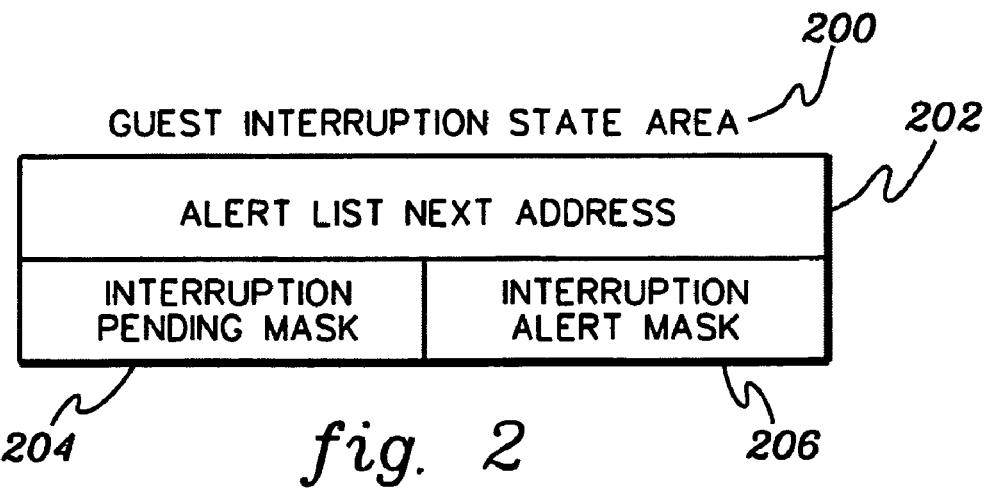
FIG. 2 depicts one example of a guest interruption state area for a guest operating system of FIG. 1, in accordance with an aspect of the present invention.

One example of a GISA is described with reference to FIG. 2. A GISA 200 is aligned on a quad-word boundary, as one example, and includes, for instance, the following:

(a) Alert list next address 202 which points to the next GISA in an alert list. An alert list is a linked list of GISAs, each corresponding to a guest for which there is at least one pending alerting condition. The alert list enables aggregation of interruptions for a plurality of guests, if such a situation warrants aggregation. If this GISA is the last in the alert list, then address 202 is zero. If the GISA is not in the alert list, then the address points to the GISA itself.

(b) Interruption pending mask (IPM) 204 is a mask associated with the guest that includes indicators for a plurality of interruption subclasses (ISCs) associated with the guest. As one example, the zSeries architecture provides added granularity of control of I/O interruptions by providing eight I/O interruption subclasses which are maskable via, for instance, Control Register 6. Each interruption subclass (ISC) controls the enablement of that subclass of I/O interrupt. There is a one for one correspondence between the bits of the IPM and the interruption subclasses in the guest's control register 6. When an adapter interruption is made pending for a guest, the bit in the IPM that corresponds to the ISC associated with the device presenting the interruption is set to one by the CPC. A bit in the IPM is reset (no adapter interruption pending state), when the corresponding interruption is presented to the guest; withdrawn by the host program; or reset.

c) Interruption Alert Mask (IAM) 206 is another mask corresponding to a guest. In one example, each bit in this mask also corresponds one for one with the eight I/O interruption subclass enablement bits located in the guest's control register 6. This mask is set by the hypervisor, when the hypervisor is to be notified (called an alert-interruption condition or alerting condition) that adapter interrupts on certain guest interruption subclasses are to be presented to the guest program. For example, when a guest program is in the wait state (i.e., non-dispatchable) and thus, the hypervisor does not have initiative to dispatch the guest program, the hypervisor is to be notified (via the alert interruption condition) of an adapter interruption pending condition for the guest in the wait state. The alert interruption provides initiative for the hypervisor to be given control so that it can then schedule the guest program to be dispatched. As described in further detail below, when a bit in the IAM is set, and an adapter interruption corresponding to the same guest interruption subclass is to be made pending, an alerting condition is created. After the alerting condition is recognized, the IAM is reset. This is an example of a case where the alert list is used to keep track of the list of guest programs for which the hypervisor is to process interruptions.

The GISA facilitates the presenting of adapter interruptions to the guest programs. Depending on the state of the guest program, the adapter interruption is presented directly to the guest program without hypervisor intervention, or some hypervisor involvement is used so that pending interruptions are presented timely. This is described in further detail with reference to FIGS. 3-5.

Figure 3:
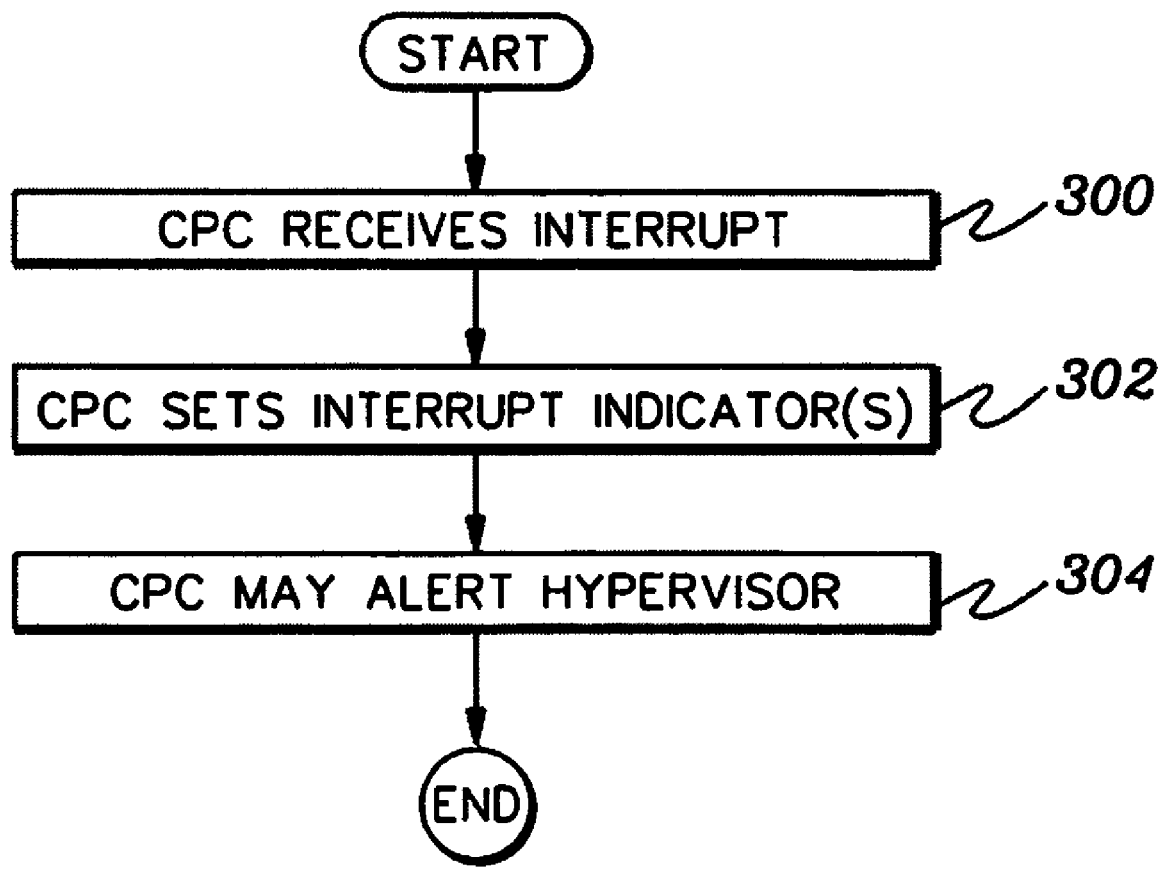
FIG. 3 depicts one embodiment of the logic associated with receiving an I/O interruption, in accordance with an aspect of the present invention.
Figure 4A:
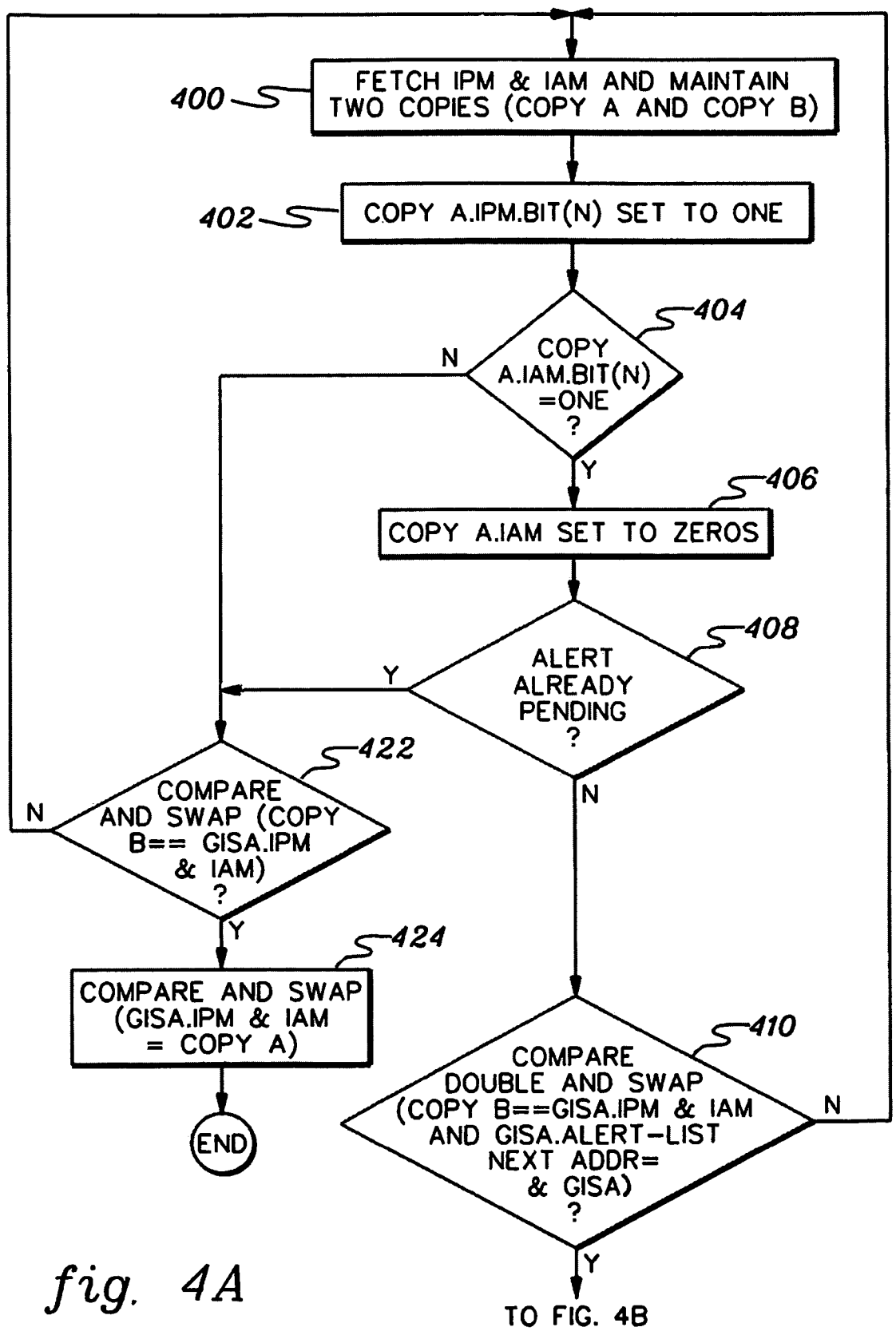
FIGS. 4a-4b depict one embodiment of details associated with posting a received I/O interruption, in accordance with an aspect of the present invention.
Figure 4B:
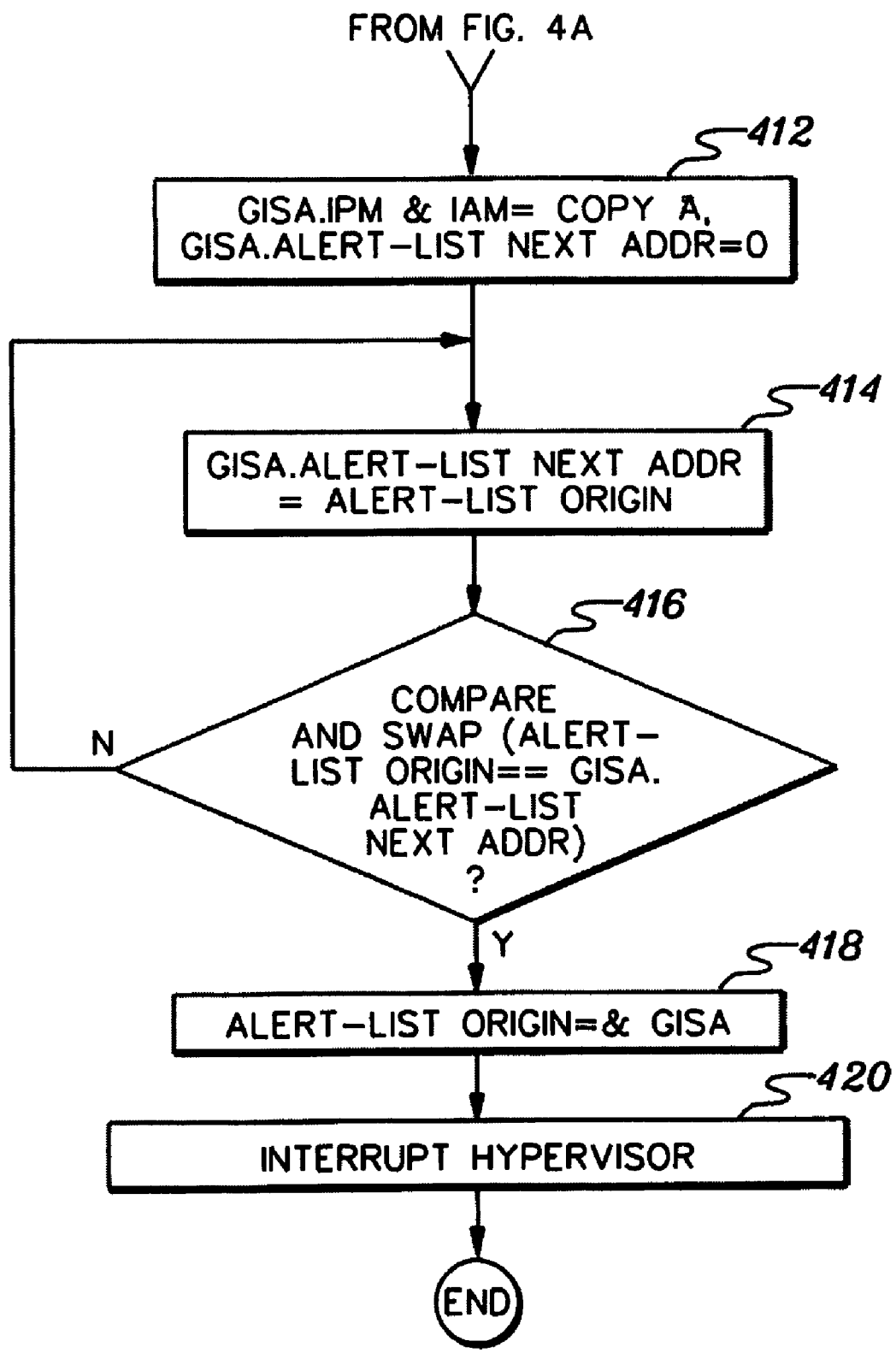
Figure 5:
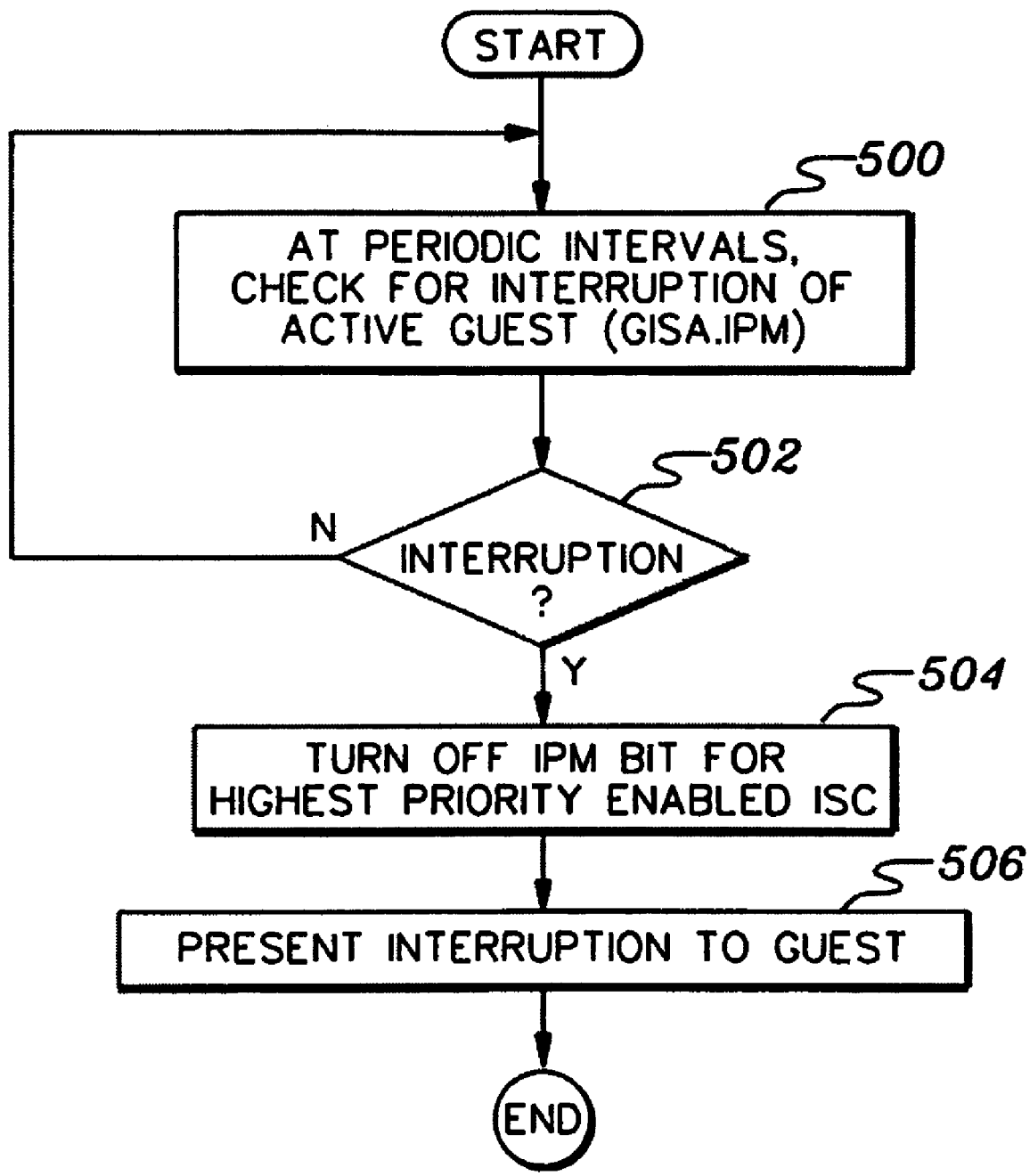
FIG. 5 depicts one embodiment of the logic associated with presenting a posted I/O interruption, in accordance with an aspect of the present invention.

FIG. 3 depicts one embodiment of the logic associated with receiving an interruption for a guest, in accordance with an aspect of the present invention; FIGS. 4a-4b provide one embodiment of further details regarding the posting of a received I/O interruption; and FIG. 5 depicts one embodiment of the logic associated with presenting a posted interruption to an active guest.

Referring to FIG. 3, the central processing complex receives an interrupt, such as an adapter interrupt, from the I/O subsystem via, for instance, hardware generated signals, STEP 300. In response to receiving the interrupt, the CPC sets one or more interrupt indicators, STEP 302. In one example, this includes setting an IPM bit associated with the guest to which the interrupt is to be presented. Moreover, the CPC performs various actions to determine whether the hypervisor is to be alerted to an interruption condition, STEP 304. These actions, as well as setting the indicator, are described further with reference to FIGS. 4a-4b.

Referring to FIG. 4a, in response to an interruption being received by the CPC, the IPM and IAM are fetched from the GISA and two copies (e.g., Copy A and Copy B) are kept in, for instance, a work area in main memory, STEP 400. Thereafter, the IPM bit in Copy A corresponding to N, where N is the ISC number for the interruption to be posted, is set to, for instance, one, STEP 402. A determination is also made as to whether the corresponding IAM bit is currently set, INQUIRY 404.

If the IAM bit is set, indicating that the hypervisor is to be alerted, then the IAM is reset, STEP 406. In one example, this includes setting the entire IAM to zeros. Moreover, a determination is made as to whether an alert is already pending for this guest, INQUIRY 408. If the alert list next address (Naddr) in the GISA points to itself indicating that the alert is not already pending, then the GISA is inserted into the alert list, as follows. A determination is made as to whether the IPM and IAM of Copy B equal the IPM and IAM of the GISA and whether the alert is still not pending for this GISA, INQUIRY 410. If the compare is successful, then the alert list next address in the GISA is set to zeros, and the IPM and IAM of the GISA are set to Copy A, STEP 412 (FIG. 4b). In one example, INQUIRY 410 and STEP 412 are accomplished by an atomic compare double and swap operation. Next, the Naddr in the GISA is set to the contents of an alert list origin (ALO) stored in, for instance, a global control block, STEP 414. Moreover, a determination is made as to whether the ALO and the Naddr value just placed in the GISA are equal, INQUIRY 416. If unequal, processing continues with STEP 414. Otherwise, the address of the GISA is swapped into the ALO, STEP 418 and, an alerting interrupt initiative is generated for the hypervisor, STEP 420. In one example, the check of INQUIRY 416 and the swap of STEP 418 are performed by an atomic compare and swap operation.

The alerting interruption is either made pending or suppressed for a period of time (e.g., as preset by the hypervisor) allowing alerts to aggregate for the hypervisor. In response to accepting by the hypervisor the alerting interruption from the CPC, the alert list is examined and the corresponding guests are serviced by the hypervisor. The hypervisor can aggregate the processing of multiple pending interruptions for multiple guests during a single hypervisor invocation, instead of having to be dispatched to process each request individually. This processing includes removing the affected guests from the wait state and placing them on the dispatch queue.

When the hypervisor processes the alert list, it first performs a compare and swap operation to atomically retrieve the alert list origin and place zeros in the alert list origin. By doing so, a new alert list is subsequently created for the CPC causing the hypervisor's fetching of the alert list to appear atomic. Since the hypervisor and the CPC can update the fields in the GISA concurrently, when the hypervisor processes the GISA for alerting interruptions, it dequeues the GISA from the alert list first (e.g., sets the alert list next address to point to the GISA itself), before again making the IAM non-zero. By doing so, the hypervisor ensures that no alert interruption condition is lost.

Returning to INQUIRY 410 (FIG. 4a), if the IPM and IAM in the GISA are not equal to the IPM and IAM in Copy B, then processing continues with STEP 400. Further, returning to INQUIRY 404, if the IAM bit in Copy A is not one or if the GISA is already a part of the alert list (the alert list next address does not point to itself), INQUIRY 408, then a determination is made as to whether the IPM and IAM in the GISA are equal to the IPM and IAM in Copy B, INQUIRY 422. In one embodiment, this determination is made by a compare and swap operation. For example, the compare and swap instruction atomically compares Copy B with the appropriate portions of the GISA. If they are unequal, processing continues with STEP 400. Otherwise, the IPM and IAM of the GISA are set to the IPM and IAM of Copy A, STEP 424.

Since the guest is active (e.g., IAM is zero), the adapter interruption is presented to the guest without hypervisor intervention. This is described further with reference to FIG. 5. In one example, when the guest is active, IPM bits in the GISA corresponding to the guest are examined periodically to determine whether there is a pending interruption for that guest, STEP 500. If there is no interruption pending for the guest, then processing continues at STEP 500. Otherwise, if there is a pending interruption, then the IPM bit is turned off, for example, for the highest priority enabled ISC, STEP 504. Additionally, the adapter interruption is presented to the guest for this ISC, STEP 506. In one example, this is performed by storing the current program status word (PSW) and I/O interruption code in guest memory, and loading a new PSW from guest memory to give control to the interruption handler in the guest program.

In the case where a guest program is dispatchable but not active, the interruption is presented in the manner above when the guest becomes active.

Described in detail above is a capability for providing interrupts to guests which minimizes hypervisor involvement. The capability is facilitated by a memory mapped virtualization technique in which interruption hardware is virtualized. This capability can be used for any hardware that generates stateless interruptions (e.g., does not carry other information apart from the interruption). Advantageously, one or more aspects of this capability significantly reduce the processing overhead involved with presenting adapter interruptions to pageable mode guest operating systems, as well as other guest operating systems.

In one example, one or more aspects of the present invention can be included as part of an adapter interruption facility. One example of such a facility, without the extensions of the present invention, is included in eServer zSeries 900 servers, offered by International Business Machines Corporation, Armonk, N.Y. Further, information regarding one or more aspects of the facility is described in "zSeries Features For Optimized Sockets-Based Messaging: HiperSockets and OSA-Express," by M. E. Baskey et al., which is hereby incorporated herein by reference in its entirety.

With such a facility, the interruption initiative presented to the hypervisor may be facilitated by employing a global summary provided by the facility. A program can use one or more instructions to test the state of a global summary indicator, or set or reset the indicator. Further, the time intervals for providing alerting interruptions to the hypervisor can be calculated according to a time delay technique that uses an adapter time delay value and adapter current time value of the facility.

As a further example, the starting address of the GISA for a particular guest is provided by the hypervisor to the CPC when a guest is made active. Additionally, the address of the owning guest's GISA for a particular device is provided by a system configuration command. Therefore, the address of the GISA uniquely identifies its associated guest and correlates that guest with the devices it owns. Yet further, the ALO is maintained in a global control block, referred to as a guest information block (GIB).

Although a computing environment is described above, one or more variations of the environment may be made without departing from the spirit of the present invention. For example, the CPC may include one or more logical partitions in which one or more virtual machines are residing therein. Further, if one or more logical partitions are provided, then an LPAR hypervisor may also be provided. Additionally, one or more CPCs an be provided.

Further, even though one or more aspects of the present invention are described with reference to a virtualized real memory environment, one or more aspects of the present invention are applicable to other environments that do not have or use per-guest interruption hardware.

Moreover, although examples of controls are provided herein, one or more other controls may be used and/or one or more modifications to one or more of the controls (e.g., different number of bits, etc.) may be made without departing from the spirit of the present invention.

Further, other variations to the described logic can be made without departing from the spirit of the present invention. For example, in another embodiment, alerts are aggregated by generating the altering interruption to the hypervisor only when the alert list transitions from empty to non-empty. Since the hypervisor processes the entire alert list in response to an alerting interruption, this technique avoids redundant alerting interruptions for which no additional hypervisor processing is necessary.

Yet further, although the guests in the examples provided herein are operating systems, other guests may benefit from one or more aspects of the present invention. Additionally, other than adapter interruptions can be managed in accordance with one or more aspects of the present invention.

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system of managing input/output (I/O) interruptions, said system comprising:
   an aggregated list of a plurality of notifications for a plurality of guest programs of a computing environment for which a plurality of I/O interruptions are to be presented; and
   a hypervisor of the computing environment to process at least one notification of the plurality of notifications of the list.

2. An article of manufacture comprising:
   at least one computer usable storage medium having computer readable program code logic stored thereon to manage input/output (I/O) interruptions, the computer readable program code logic comprising:
   logic to obtain an I/O interruption for a guest program of a virtualized real memory environment;
   logic to determine a dispatch state of the guest program;
   logic to provide the I/O interruption to the guest program absent intervention by a hypervisor of the virtualized real memory environment, in response to the dispatch state being of one state; and
   logic to provide the I/O interruption to the guest program with hypervisor intervention, in response to the dispatch state being of another state.

* * * * *